United States Patent [19]
Bennett

[11] Patent Number: 5,115,343
[45] Date of Patent: May 19, 1992

[54] PYLON

[76] Inventor: Reginald S. Bennett, 44 Charles Street, West, Suite 4408, Toronto, Ontario, Canada, M4Y 1R8

[21] Appl. No.: 617,766

[22] Filed: Nov. 26, 1990

Related U.S. Application Data

[63] Continuation-in-part of Ser. No. 507,840, Apr. 12, 1990, abandoned, which is a continuation-in-part of Ser. No. 469,376, Jan. 24, 1990, abandoned.

[51] Int. Cl.$^5$ .................... G02B 5/122; G02B 5/12; E01F 9/00
[52] U.S. Cl. .................... 359/529; 359/515; 116/63 P; 116/63 C
[58] Field of Search .......... 350/97, 102-104, 350/107, 109; 116/63 R, 63 P, 63 C, 63 T; 40/903; 404/6-9; 359/533

[56] References Cited

U.S. PATENT DOCUMENTS

| | | | |
|---|---|---|---|
| 2,935,238 | 5/1960 | Koehler | 116/63 P |
| 4,202,600 | 5/1980 | Burke et al. | 350/97 |
| 4,466,376 | 8/1984 | Wells | 116/63 C |
| 4,798,747 | 1/1989 | Laramee | 116/63 C |

Primary Examiner—Bruce Y. Arnold
Assistant Examiner—James Phan

[57] ABSTRACT

A truncated pyramidal pylon, has retroreflectant side walls each sloping at 8°-10° to the vertical for helicopters and 3°-6° to the vertical for fixed wing aircraft. The pylon may be constructed as a permanently erected unit or as a collapsible arrangement from hingedly connected flat surfaces, with a surface corresponding to each side, foldable to provide the assembled pylon.

26 Claims, 5 Drawing Sheets

FIG. 14

PYLON

This application is a continuation-in-part of application Ser. No. 07/507840 filed Apr. 12, 1990 (now abandoned), which was a continuation-in-part of application Ser. No. 07/469376 filed Jan. 24, 1990 (abandoned Oct. 31, 1990).

This invention relates to a landing pylon useful for aiding night landing of helicopters or fixed wing aircraft but also useful as an emergency marker to be carried in ambulances, or other emergency vehicles.

By 'aircraft' herein I mean fixed wing aircraft. The invention generally relates to marking the landing area for a helicopter or aircraft and giving an indication of the desired approach path.

The invention comprises means to provide an upwardly extending column defining a vertical axis. The column will be laterally defined by a plurality of outwardly facing upwardly extending side panels which are highly retro reflectant. In one preferred aspect of the invention the side panels will be designed, when the axis is vertical, to slope (for helicopters) at 8°-10° to the vertical in accord with the fact that the preferred angle of approach of a helicopter to a landing area is along a path about 9° to the horizontal. For aircraft the side panels slope at 3°-6° to the vertical to correspond to aircraft approach angles of 3°-6° to the horizontal. Thus the side panels preferably slope at between 3° and 10° to the vertical. It is understood that the helicopter or aircraft will be provided with lights and a searchlight adapted to project a beam along its approach path so that the helicopter or aircraft pilot will receive a brighter reflection when located on the desired approach path than when the helicopter or aircraft is located above or below the said path.

In one form the pylon is provided in permanently erected form.

In an alternate preferred form of the invention the side panels are provided in a flat blank wherein side surfaces are collectively arranged in a flat blank with the side edges of adjacent side panels hingedly connected; with the side surfaces at each end of a connected group being detachably hingedly connectible to each other. Constructed in this way the panels may be folded at each hinged connection at equal angles to form the pylon. For storage or transportation this pylon may have the detachable connection disconnected and be unfolded flat for convenient stacking.

In its form as a flat blank the pylon is useful for carrying by ambulances or other emergency vehicles where it will have many uses in addition to those as a landing pylon. In such emergency vehicles its qualities of compact storage and transportation are of considerable importance.

In the alternative discussed in the two previous paragraphs, the preferred means and method of constructing the connected panels is by constructing them of molded plastic with 'living hinges' that is the side surfaces with connecting thin films or skins of the same plastic material are molded in a single molding operation with the free edge connecting means also formed integrally and in the same molding step. With this arrangement the convenience of compact stacking is combined with efficiency of manufacture.

The alternate arrangement described in the two previous paragraphs is preferably arranged, for aircraft or helicopter landing to provide, in erected attitude, the desired surface sloping angles of 8° to 10° or 3° to 6° previously described and will preferably have four sides arranged to form a square in section.

The alternate arrangement described in the three previous paragraphs may preferably be provided with a top panel, also retro-reflectant, hingedly connected to the top edge of one of the side surfaces and connectable (preferably by integrally molded means) with the top edges of the other side surfaces to form an upwardly reflecting top panel in erected attitude.

With a plastic construction each alternative may be provided with metal weighting means, attachable after molding or molded in as part of the molding process.

A plurality of such pylons arranged in a suitable pattern may be used to delineate a landing area or strip in remote areas which include: national or provincial parks, lumber camps, remote villages, the grass area in a highway clover-leaf or beside a highway.

To assist helicopter landing, an array of the pylons will usually be used to define a square of desired area, or circle of desired diameter for example, it is desirable to use (for example) 16 of such pylons to define the outside boundaries of a square of (for example) 86' per side. The pylons will customarily be separated approximately 20'. A circular array will sometimes be used.

In its preferred form, the pylon is square in any horizontal section. Thus 16 such square-plan pylons for a helicopter, are preferably arranged at the corners and equally spaced along the sides of an 86' square with the four sides of the pylon (in plan) parallel and perpendicular to the side of the square formed by 16 of them. For an aircraft strip the pylons may be arranged in two rows to border the strip.

It is not thought necessary to provide internal levelling means for pylons. However, these in one aspect the pylons are preferably each provided with a bubble level mounted to indicate deviation from a level position and when a level position is achieved. In the level position, the pylon "vertical" axis will be truly so. Each pylon is thus placed in location on the field at the landing area and shimmed or adjusted by objects placed beneath its base until level attitude is achieved.

The side surfaces or panels are preferably covered with retro-reflecting material. By 'retro-reflecting' I mean a surface that will reflect light back in the incident direction over a wide range of angles to the normal.

The invention preferably makes use of retro-reflectant surfaces made up of cube corner reflectors as described in the following U.S. Pat. Nos.
2,380,447 Jungerson
3,712,706 Stamm
3,684,348 Rowland
3,810,804 Rowland
4,025,159
4,202,600 Burke The teachings of the above patents are incorporated herein by reference.

In particular the invention preferably makes use of cube corner retro-reflective sheeting as described in the Burke U.S. Pat. No. 4,202,600 where regular arrays of cube corner sheets are arrayed in zones (indistinguishable to the user) oriented relative to adjacent zones in such a way that retroreflective intensity variation with azimuthal angle is reduced at high angles of incidence to the normal to the sheet.

By an array is meant an ordered group of cube corner triads. A 'zone' is the area occupied by such an array.

In a preferred form of the invention the pylon is formed as a hollow container so that it may be filled or partially filled with ballast to weight it in place.

In a preferred form of the invention the top of the pylon is designed to be perpendicular to the vertical axis and to provide a highly reflectant surface, preferably of different colour to the side wall surfaces, directed upwardly and providing an indication to a helicopter pilot (to a downwardly directed light) that he is "hovering" over the landing area.

In a preferred form of the invention the bottom of the pylon is made detachable so that when not in use the bottom may be removed and the sloping side panels of a number of pylons nested for compact packing or transport.

In a preferred form the pylon is provided with an outwardly directed flange at the base which is preferably made hollow so that it may be filled with ballasting sand or other material. Anchors for anchoring the pylon on the ground may also be provided.

With the ballasting and anchoring means the goal with pylons for helicopter landing areas is to ensure that they are capable of withstanding a down draft from the helicopter rotor or wind gusts, up to 75 kilometres per hour.

In a preferred embodiment the pylon is provided with side panels and a top panel, as described; differently colored upper panels are provided sloping between the side panels and the top panel at an angle of 30° to 60° to the vertical. The upper panels are narrower in their sloping than in their horizontal direction and covered with retroreflectant material to provide through retro-reflection a horizontal line which acts as an artificial horizon to the helicopter pilot which acts as a safety feature to lessen the likelihood of dynamic roll-over.

A critical point in flying a helicopter is the arrival or departure from the site. During this operation a certain portion of time is spent in the hover mode. Whilst in this position it is essential that the pilot have access to a horizontal reference datum to present the possibility of dynamic roll-over. To this end the top bevel or sloping lid of the pylon has been designed to provide a horizontal band of alternatively colored retroreflective material. The choice of angle for this feature is 45° which ensures that the pilot is not blinded by reflection.

In one alternative form of the permanently erected form of the pylon it is designed to be downwardly opening and to nest with a pylon above and below. The pylons in this alternative are provided at the base with an outwardly extending flange. The geometry of the flange is chosen, relative to the sloping walls of the pylon, so that in nesting arrangement the flanges of each pylon contact the flanges of the next pylon above or below but maintain spaced the side, upper and top panel surfaces of adjacent pylons. In this way the retroreflectant surfaces of the panels are not damaged by nesting the pylons and removing them from nested arrangement.

With each alternative means may be provided to support the pylon above ground surface for better visibility (for example-deep snow).

In drawings which illustrate a preferred embodiment of the invention.

Figures 1, 2:
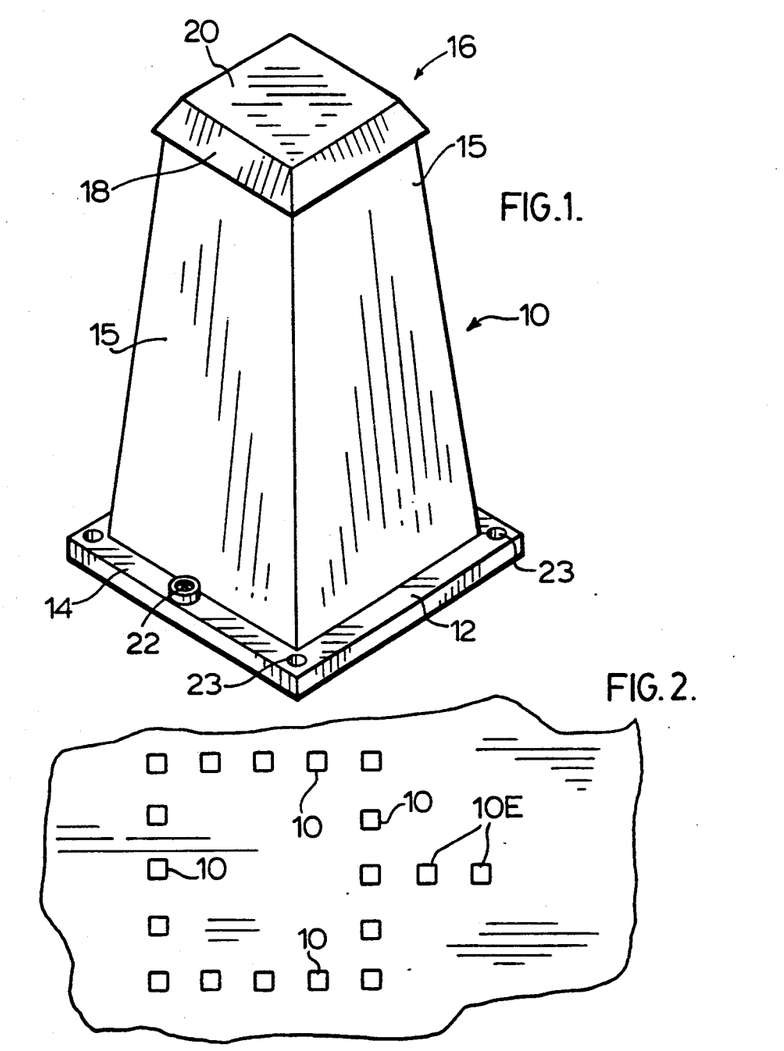
FIG. 1 is a perspective view of a pylon in accord with the invention.
FIG. 2 is a schematic view showing a preferred arrangement of the pylons to define a landing spot.

In the drawings the pylon 10 comprises a base 12 having four symmetrically arranged upward-inwardly sloping side walls or panels 15 extending upwardly therefrom but preferably inset from the outer edges of the base to provide a sill 14. The pylon is preferably symmetrical about a vertical axis. The sloping side walls for helicopter use are defined by planar outwardly facing surfaces sloping outwardly between 8° and 10° (preferably 9°) to the vertical axis. For aircraft the side walls will slope at 3°-6° to the vertical axis. A cap 16 covers the upper edges of the side walls and extends slightly outwardly therefrom to prevent rain and dust from getting into the inside of the pylon which is preferably hollow as hereinafter described. The cap has four peripheral surfaces 18 sloping inwardly at about 45° to the horizontal, bordering a horizontal upwardly facing square surface 20.

The side panels and the upper square panel are designed to be retro-reflectant and preferably to reflect most brightly to a helicopter or aircraft which is projecting its light normal to the plane of a side panel, and to reflect to a substantial but lesser extent to a helicopter shining its light obliquely on the surface. Preferably a sheet of retro-reflecting material is laminated on the outer surface of the panels to provide its reflectivity.

The pylons may be made from any material. I prefer to use ultra violet stabilized plastic. Plywood and other materials may be used.

Figure 3:
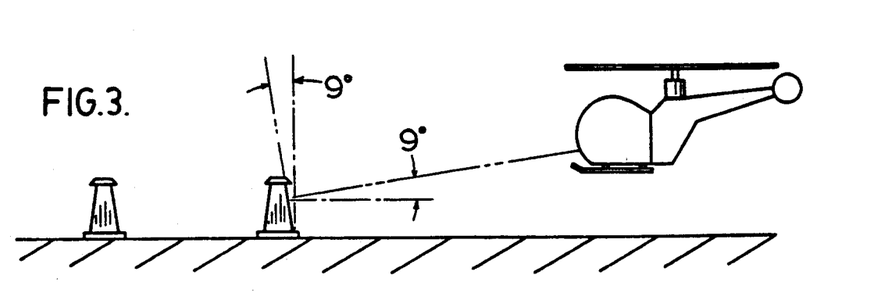
FIG. 3 is a side of a pylon showing the approved angle of a helicopter approach path.

FIG. 3 shows a helicopter approaching at 9° to the horizontal and in the travel direction of the helicopter so that preferably the pilot will receive a brighter reflection than if he is above or below the 9° approach path or to the right or left of the perpendicular to the reflecting surface. (This is a quality of retro-reflecting surfaces). Thus the pilot will be warned that he is off path by the decreased reflected brightness.

FIG. 1 shows a bubble level 22 designed to indicate when the vertical axis of the pylon is truly vertical. Thus, with the plyon in place shims or supports are located and adjusted under the base until the bubble is centered indicating that the axis is vertical. The bubble level may preferably be located midway along a side of sill 14.

Sill 14 is preferably provided with vertical mounting holes 23 at each corner. Holes 23 may be used to mount the pylon on a concrete slab or otherwise anchor it.

Figures 4, 5:
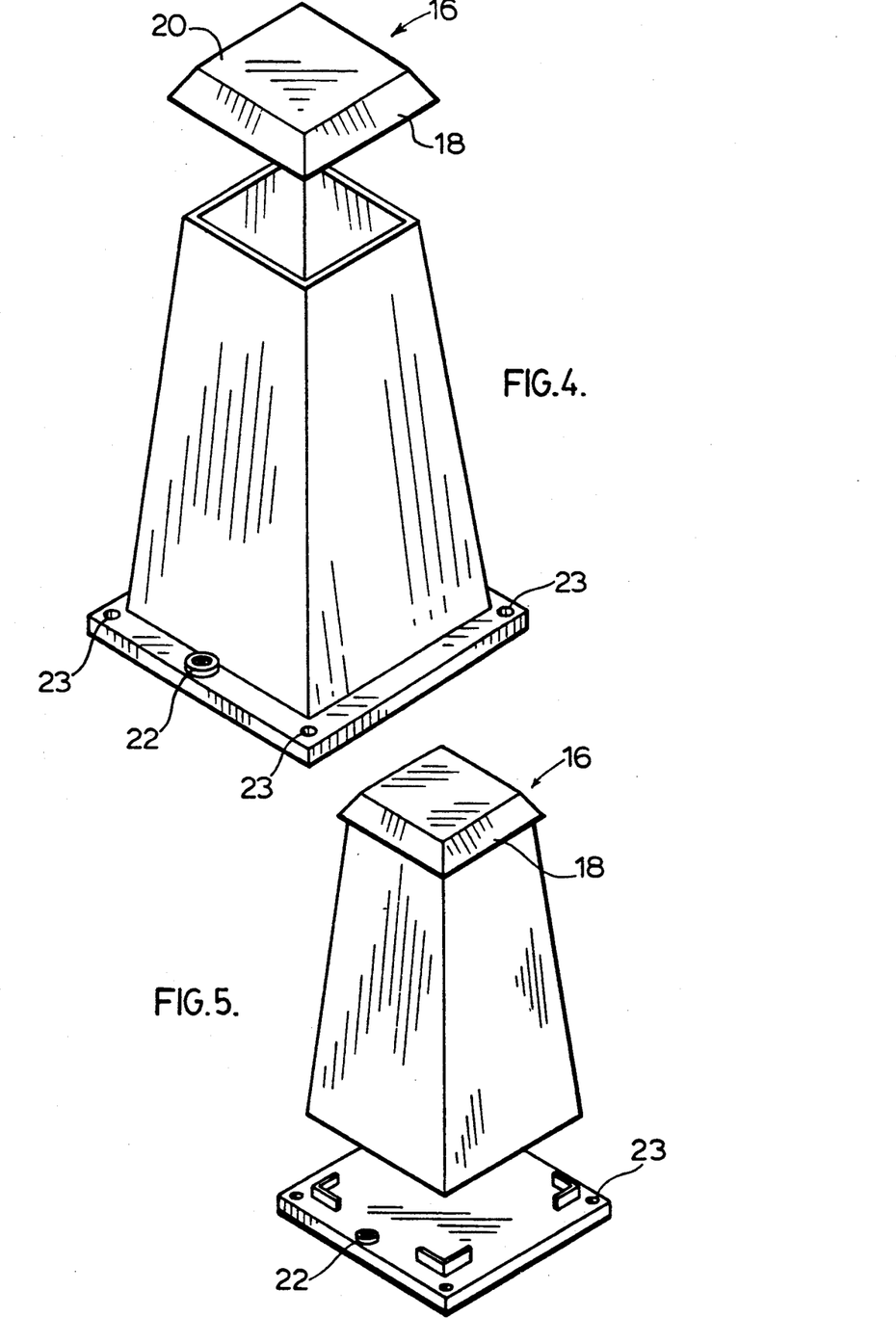
FIG. 4 shows the means allowing the filling of a hollow pylon with ballasting.
FIG. 5 shows the detachable bottom for the pylon.
Figure 6:
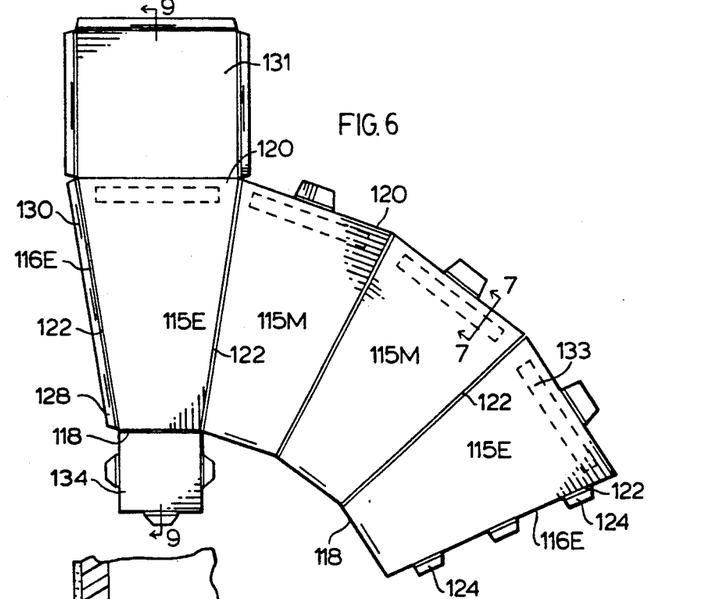
FIG. 6 shows a blank for an alternate form of the invention.

FIG. 4 shows that the device may be made a hollow container and filled with ballast to hold it in place. The opening for filling may be provided in any of a number of different ways and one way is having the cap 16 removable as shown in FIG. 4.

Preferably the upper panel 20 is made retro-reflectant but of a contrasting colour to the side walls so that the pilot (with a downwardly directed light) may tell when he is directly over an array of pylons. For such applications it is believed most effective to make the side walls 15 of yellow retro-reflectant material and the top wall of red retro-reflectant material.

As FIG. 5 shows the bottom 12 may be made detachable from the four side walls 15 which side walls form a single unit. The bottom 12 may be made detachably attachable in any desired manner FIG. 5 shows a base 12 provided with L-shaped flanges 25 which rest inside the corners of the side walls and hold them in place. Bolts or screws may be used to attach the flanges to the side walls if desired. For packing and transportation therefore the bottoms 15 may be removed from the side walls and separately stacked while the side wall assembly may be conveniently and compactly nested.

In FIG. 2, sixteen pylons 10 are shown defining a square preferably 86' with pylon spacing of approximately 20'. If desired and as shown three or more extra pylons 10E may be provided leading into the centre of one side of the square and thus indicating the desired approach direction. In some cases a second row of pylons 10E may be provided leading out of another side of the square. This arrangement would be suitable where the entrance and exit paths for a helicopter are to be different. In such case row 10E of pylons would have distinctively coloured retro-reflectant material on opposite sides facing toward and away from the desired travel direction to indicate it to the pilot.

As shown the pylons 10 are oriented in the array so their side walls are (in section) perpendicular to and parallel to the square sides. If desired opposite pylon walls may have opposite coloured retro-reflectant material to distinguish between the inside and outside of the array or between a desirable and undesirable approach direction.

In operation the pylons are preferably arranged as shown. The side panels are designed to give lesser retro-reflections to a helicopter located above, below or to the side of the normal to the panel plane but the lesser retro-reflections are designed to be sufficient to allow the pilot to locate the array. Having located the array, the pilot descends and locates his craft until the brighter retro-reflection along the normal to the panel tells him that he is on the 9° flight path. He then descends on this flight path to landing. In addition a hovering helicopter with a vertically directed light can determine when it is directly over the array because of the brighter reflection from the top surface 20.

Although not shown it is understood that, for aircraft use, the pylons with 3°-6° side wall slope will be arranged in two lines on opposite sides of the desired landing path and may be differently coloured on opposite sides to indicate the desired landing and take-off directions.

The retro-reflectant surface side panels 15, as well as for top panel 20 is made up of cube corner reflectant material reflectors. Preferably the cube corner reflectors in such material are laminated on a sheet and attached by adhesion to the outer surface of the panel. Thus each panel is preferably of molded plastic with the cube corner reflectant layer on the outside. Preferably the retro-reflectant layer is that provided by Reflexite Corporation of New Britain, Connecticut under the model number AP1000. Other cube corner reflector arrays for rays at large angles to the normal show a wider variation in retro-reflective intensities for varying azimuthal angles. As explained in U.S. Pat. No. 4,202,600 it is possible to arrange small zones of regular arrays of cube corner reflectors so that each zone is at an angle of 90° to adjacent zones (but effectively at 30° since the regular array has 60° symmetry). It is preferred to use cube corner reflectant material arranged in this way since less variation with azimuthal angle is encountered in the retro-reflection wide angles to the normal. The pattern of each array zone and the zones themselves are made too small to be distinguishable at normal, minimum viewing distances.

Thus, it is preferred to use Reflexite, a product of Reflexite Corporation, of New Britain, Connecticut and, of their products preferred to use their Reflexite model number AP1000 as embodying the use of cube corner array zones at 90° to adjacent zones as described in the preceding paragraph.

Figure 10:
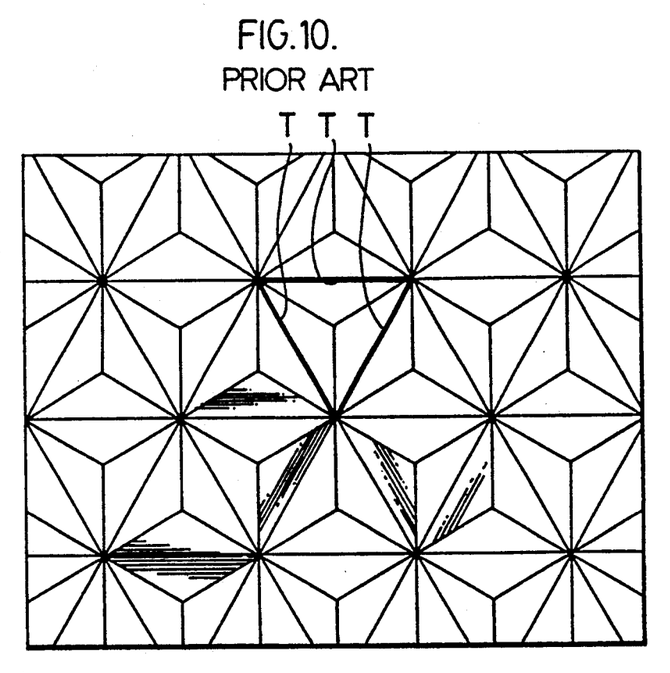
Figure 11:
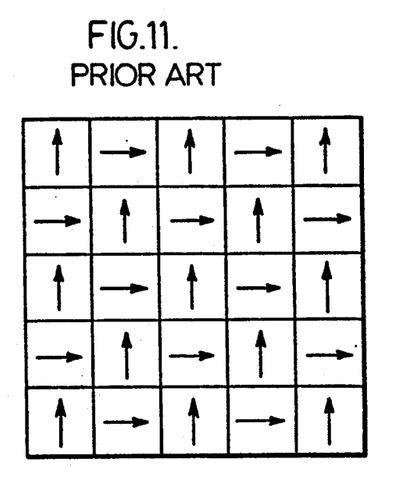
Figure 12:
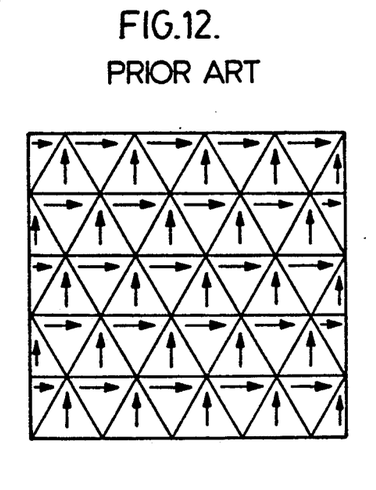

FIGS. 10-12 are taken from U.S. Pat. No. 4,202,600 previously referred to. In FIG. 10 the preferred retroreflective sheeting is schematically illustrated from the non-retroreflecting side. The array as oriented in FIG. 10 may be thought of as having an orientation corresponding to a horizontal directional arrow. As stated in U.S. Pat. No. 4,202,600 the orientation of an array with an orientation as shown in FIG. 10 can be varied in a regularly alternating pattern, such as a checkerboard pattern, in a random pattern or in any other pattern that provides sufficient mixing of different orientations to give the sheet an appearance of uniform brightness when viewed at a high angle of incidence from the minimum.

FIGS. 11 and 12 show two preferred methods of combining arrays in zones with orientations at 90° to each other. Since the arrays have 60° symmetry (90°-60°=30°) each zone has its cube corner reflectors oriented at 30° to adjacent zones. The result is reflective sheeting which for retroreflected rays at 60° to the normal, has relatively even reflectivity at different azimuthal angles about the normal.

As previously stated the preferred sheeting having the arrangements of FIGS. 11 or 12 is Reflexite, AP1000 of the Reflexit Corporation. The zones are indistinguishable at normal minimum viewing distances.

The preferred material, to produce a retroreflection for a wide range of angles about a normal to a panel, although brighter along the normal, is Reflexite (trade mark), part number AP1000 a product of the Reflexite Corporation of New Britain, Connecticut. Reflexite may be obtained in various colours including the red and yellow preferred.

The pylon panels may be made of any material, but ultra violet stabilized plastic is preferred. The reflectant surface may be laminated on an inner top or side wall in any desired manner.

Figures 7, 8:
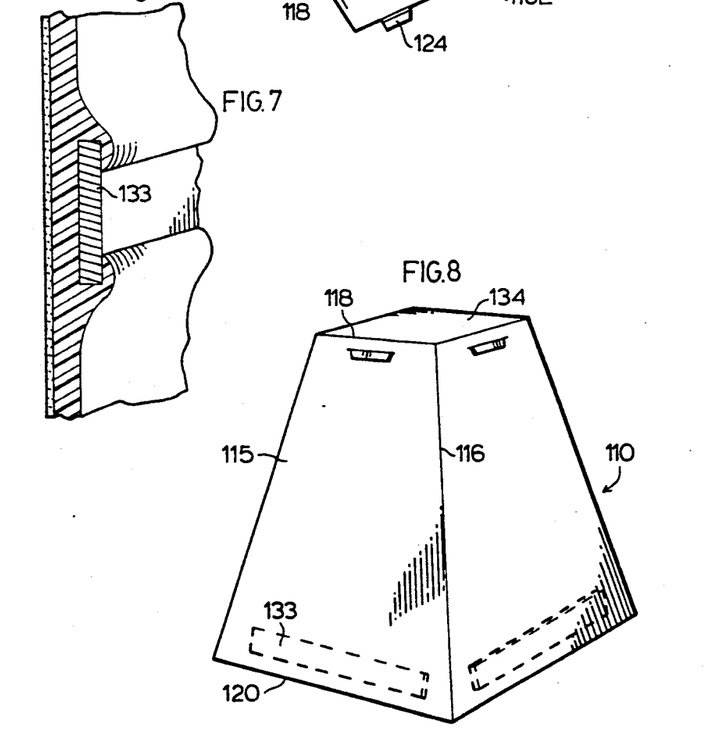
FIG. 7 is an enlarged sectional view along the lines 7—7 of FIG. 6.
FIG. 8 is a perspective view of the erected attitude of the blank of FIG. 6.
Figure 9:
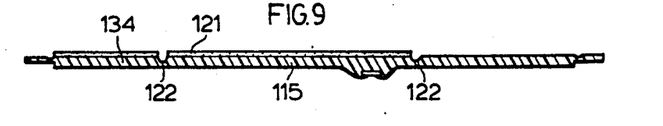
FIG. 9 is a sectional view taken along the lines 9—9 of FIG. 6, FIGS. 10—12 show the schematic arrangement of retroreflectant zones on a sheet of retroreflectant material.

FIGS. 6-9 show an alternative embodiment of the invention wherein the four side walls 115 are defined by side edges 116, top edge 118 and bottom edge 120 and arranged to be made of molded plastic in a single molding step. In the flat blank the middle side walls 115M are each joined to the adjacent side wall at initially adjacent side edges by a thin film or skin 122 of the same plastic forming the side wall, known as a "living hinge" and molded with the four side walls in a single molding step. In the flat blank the outer side walls 115E are joined to the adjacent wall 115M by a living hinge 122 as described and form as shown in FIG. 8 a pylon body 110 geometrically similar to that of body 10 of FIG. 1. The panel walls are covered with a retro-reflectant material 121, preferably laminated on and preferably Reflexite (trade mark), part number AP1000 as with the principal embodiment. The angle selected for the sloping side will be less than 20° and, for the use described for the application of FIG. 1-5, the sloping sides will define an angle of 8°-10° or 3°-6° for use in landing helicopters or fixed wing aircraft, respectively.

A top panel 134 may be hinged by a "living hinge" 136 to one of the panel 115 top edges. For ease of construction and use it is preferred to hinge the top panel to one of the end panels 115E above. The free side edges 116E of the side walls 115E are provided with mutually cooperating hinged connection means for hingedly connecting these side walls in the erected position of the pylon. These mutually cooperating means may be of any desired form but I prefer to use one (or more) tabs 124 connected to the free side edge of one of the walls 115E by a living hinge 122 and a strip 128 with a complementary slot 130, the strip being connected to the other side wall by a living hinge 122.

Thus the blank as (partially) described so far may be erected by folding the four side panels so that each is at the same angle to its neighbour panel with tab(s) 124 inserted in slot(s) 130. In erected form therefore with the folded panels so hinged the top panel and each of the top edges of the other three sides are provided with complementary tabs and slot strips with living hinges 122 similar in arrangement and use to those on the side panels.

Thus when the blank is folded for erection the top panel is attached to the side top edges (FIG. 8) a pylon very similar except for the levels 18 to the pylon of FIG. 5 is provided. The top panel will be laminated with retroreflectant material and the provision of selected colours on the sides and the top may be provided as with the embodiment of FIGS. 1-5. A bottom 131 connected by living hinging 122 and tabs, in a similar manner to the top, may be provided and is shown in dotted form. However in many applications it may be preferred to have an open bottom.

The pylon of FIGS. 6 to 9 may be provided with weight bars 133 attached to the inside of the side panels near to their lower edges. Such bars will customarily be made of iron or steel and may be molded into the panels during the single molding process. Alternatively 'keepers' of plastic may be formed in the side wall panels during the molding process adapted to detachably receive the weighting bars put in place with the pylon erected. (Such weighted bars may similiarily be molded on or used, instead of the ballasting, with the pylon shown in FIGS. 1-5).

In operation, the pylon blanks of FIGS. 6-9 may be compactly stored or transported in flat attitude. For use each pylon is erected by applying weights, if not already in place, folding the sides and attaching the free edges and folding the top into place. The erected pylons will preferably be arranged as shown and described in connection with the embodiment of FIGS. 1-5 with particular reference to FIGS. 2-3. They will be designed for helicopter or fixed wing aircraft approaches, as previously described.

The pylons of FIGS. 6 to 9 may be provided with leveling means if desired. For example two adjacent side panels may be molded each to support a level so that the two levels together will indicate a level attitude in the pylon.

If desired the pylons of either embodiment may be molded to receive support stakes so that the pylons may be supported clear of the ground for better visibility—for example in drifting snow.

Although the most common application of the invention will be to set the pylons in square, circular or other array, the pylons may be used singly, where desired.

As previously stated, the pylon of FIGS. 6-9 is useful for other purposes then for landing aircraft or helicopters. Thus, it may be carried in emergency vehicles for any use to which a reflectant pylon could be put and where its flat blank form for storing and transportation is a great advantage over prior pylons or markers. When used for other purposes than landing helicopters or aircraft the pylon may have any slope to its sides although they will preferably slope at less than 20°.

Figure 13:
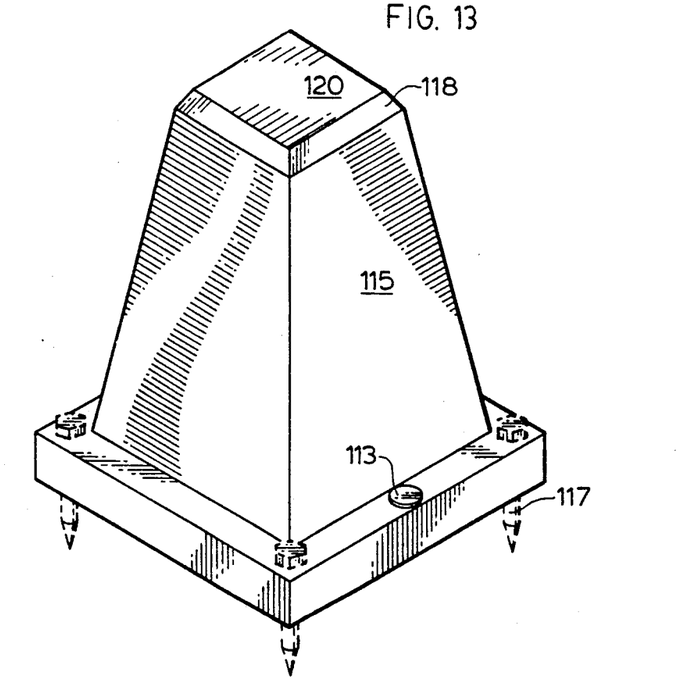
FIG. 13 shows an alternative form of pylon in accord with the invention.

FIG. 13 shows an alternative form of pylon having side panels 115, top panel 120 and upper panels 118 sloping from the upper edge of each side panel to the outer edge of the top panel. To assist in molding and nesting the panels this alternative avoids the overhang of upper panels 18 in FIG. 1.

The pylon is permanently erected rather than collapsible and preferably molded from ultra-voilet stabilized plastic. The side panels slope at 3°-10° to the vertical being at 3°-6° for helicopters and 8°-10° for aircraft. The upper panels 118 slope at about 45° to the vertical and provide a narrow vertical and extended horizontal reflection which forms an artificial horizon for a pilot. The angle of 45° is shown so that this artificial horizon will be visible to the pilot without blinding him which would be the risk if the retro reflected light were normal to the upper panel surfaces.

The bottom edges of the side walls extend, preferably integrally, into an outwardly extending peripheral flange 112. The flange 112 is preferably made hollow so that it may be filled with ballasting material, preferably sand. An opening 113 with closure 115 of any suitable type is provided. As shown in dotted form, spikes 117 may be bolted to the corners of the flange to be driven into the ground to fix the pylon in position. The pylon is preferably mounted to withstand 75 Km/hr ground winds or helicopter downdrafts. The body of the pylon is preferably made sufficiently yieldable that it will deflect on accidental contact with an aircraft or helicopter so that frangible ground mountings are not necessary.

Figure 14:
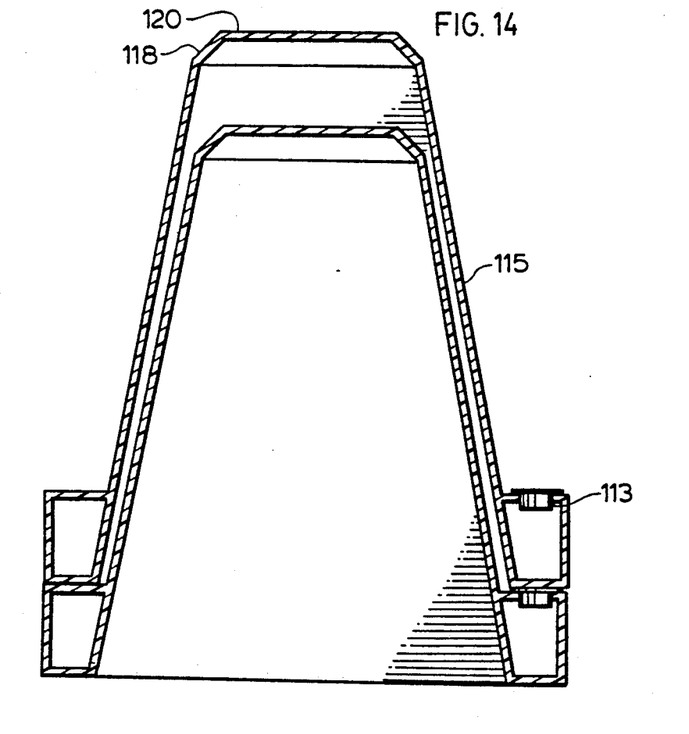
FIG. 14 is a vertical section of the pylon of FIG. 13

As shown in FIG. 14 the pylon of FIG. 14 has a bottom opening and is designed to nest with a pylon above and below. The geometry of the flange and the panels of the pylon are selected so that in nested arrangement the flanges 112 contact and position the pylons relative to each other so that the side, upper, and top panels of each pylon are spaced from the one above. This avoids friction and scuffing of the retro reflectant surface of one pylon by the one above so that the reflectant surface is not affected by friction or scuffing when nested or removal from nested position.

The pylon of FIGS. 13 and 14 has retro reflectant side, upper and top panels and preferably uses retroreflectant Reflexite (trademark) as discussed in connection with the other alternatives).

The layout of heliport and spacing of pylons using the circular and square format to define the helipad boundary.

HELIPAD
Landing Pylon Layout

Circular Format

| Diameter of Helipad Retro-flective Perimeter | Equal Spacing Between Pylons | Pylons Required |
|---|---|---|
| 115.0' | 30.1' | 12 |
| 115.0' | 27.7' | 13 |
| 115.0' | 25.8' | 14 |
| 115.0' | 24.0' | 15 |
| 115.0' | 22.5' | 16 |
| 115.0' | 21.2' | 17 |
| 115.0' | 20.0' | 18 |

Square Format

| Length of Each Side | Equal Spacing Between Pylons | Pylons Per Side | Total Pylons Required |
|---|---|---|---|
| 115.0' | 28.7' | 5 | 16 |
| 115.0' | 23.0' | 6 | 20 |
| 115.0' | 19.1' | 7 | 24 |

I claim:

1. Landing pylon comprising means for stably supporting, on a support surface, an upwardly extending column, defining a vertical axis; said upwardly extending column, being defined by a plurality of generally flat side panels sloping inwardly and upwardly at between 3° and 6° to the vertical axis, said panels designed to be retroreflectant and to provide a higher degree of retroreflection in directions normal to said panels and substantial but lesser retroreflectance at other angles.

2. Landing pylon as claimed in claim 1 having four such flat surfaces arranged to define a square in horizontal section.

3. Landing pylon comprising means for stably supporting, on a support surface, an upwardly extending column, defining a vertical axis; said upwardly extending column, being defined by a plurality of generally flat side panels sloping inwardly and upwardly at between 8° and 10° to the vertical axis, said panels designed to be retroreflectant and to provide a higher degree of retroreflectance in directions normal to said panels and substantial but lesser retroreflectance at other angles.

4. Landing pylon as claimed in claim 3 having four such surfaces arranged to define a square in horizontal section.

5. Landing pylon comprising means for stably supporting, on a support surface, an upwardly extending column, defining a vertical axis; said upwardly extending column, being defined by a plurality of generally flat side panels sloping inwardly and upwardly at between 3° and 10° to the vertical axis, said panels designed to be retroreflectant and to provide a higher degree of retroreflection in directions normal to said panels and substantial but lesser retroreflectance at other angles; including level means designed to indicate the attitude at which said axis is vertical.

6. Landing pylon, as claimed in claim 5 having four such flat surfaces arranged to define a square in horizontal section.

7. Landing pylon comprising means for stably supporting, on a support surface, an upwardly extending column, defining a vertical axis; said upwardly extending column, being defined by a plurality of generally flat side panels sloping inwardly and upwardly at between 3° and 10° to the vertical axis, said panels designed to be retroreflectant and to provide a higher degree of retroreflection in directions normal to said panels and substantial but lesser retroreflectance at other angles; whereas said column has an upwardly facing top surface generally perpendicular to the vertical axis, and having a retroreflectant surface contrasting in colour to that of said side surfaces.

8. Collapsible landing pylon comprising at least three connected flat surfaces each having a pair of side surfaces, and each surface being hingedly connected to an adjacent surface at mutual side edges, and means for connecting the free side edges of the two end surfaces,
    said surfaces being shaped and hinged so that said free side edges are connected, and when erected by folding each side surface at the same angle to its connected surface(s) and connecting the free side edges with the corresponding surfaces at the same angle there is formed:
    a landing pylon defining a vertical axis
    and an upwardly extending column being defined by said folded side surfaces sloping inwardly and upwardly,
    said flat surfaces being adapted to be reflectant and to provide a higher degree of retroreflection at reflection angles normal to said folded side surfaces but lesser retroreflection at other angles, wherein the angle of the sloping side surfaces to the central axis is 3° to 6°.

9. Collapsible pylon as claimed in claim 8 constructed of molded plastic with integrally molded hinges and designed to be coupled to weighting means when erected.

10. Collapsible landing pylon comprising at least three connected flat surfaces each having a pair of side surfaces, and each surface being hingedly connected to an adjacent surface at mutual side edges, and means for connecting the free side edges of the two end surfaces,
    said surfaces being shaped and hinged so that said free side edges are connected, and when erected by folding each side surface at the same angle to its connected surface(s) and connecting the free side edges with the corresponding surfaces at the same angle there is formed:
    a landing pylon defining a vertical axis
    and an upwardly extending column being defined by said folded side surfaces sloping inwardly and upwardly,
    said flat surfaces being adapted to be reflectant and to provide a higher degree of retroreflection at reflection angles normal to said folded side surfaces but lesser retroreflection at other angles, wherein the angle of the sloping side surfaces to the central axis is 8° to 10°.

11. Collapsible pylon as claimed in claim 10 constructed of molded plastic with integrally molded hinges and designed to be coupled to weighting means when erected.

12. Collapsible landing pylon comprising at least three connected flat surfaces each having a pair of side surfaces, and each surface being hingedly connected to an adjacent surface at mutual side edges, and means for connecting the free side edges of the two end surfaces,
    said surfaces being shaped and hinged so that said free side edges are connected, and when erected by folding each side surface at the same angle to its connected surface(s) and connecting the free side edges with the corresponding surfaces at the same angle there is formed:
    a landing pylon defining a vertical axis and an upwardly extending column being defined by said folded side surfaces sloping inwardly and upwardly, said flat surfaces being adapted to be reflectant and to provide a higher degree of retroreflection at reflection angles normal to said folded side surfaces but lesser retroreflection at other angles; wherein the angle of the sloping side surfaces to the central axis is 3° to 10°.

wherein said side surfaces have parallel upper and lower edges and a top panel having a retroreflectant outer surface is hingedly connected to one of said upper edges, shaped to substantially meet said other upper edges when folded to be perpendicular to said central axis, means or said top panel for connecting said panel to each of said other upper edges.

13. Landing pylon comprising an upwardly extending column, defining a vertical axis, said column being defined by a plurality of generally flat side panels sloping inwardly and upwardly, said panels designed to be retroreflectant and to provide a higher degree of retroreflection in directions normal to said panels and substantial but lesser retroreflectance at other angles, said pylon including a flange member, outwardly extending from the bottom of each side panel, said flange member being hollow and provided with means for filling with ballasting material, wherein said side panels slope upwardly at between 3° and 6° to the vertical axis.

14. Landing pylon comprising an upwardly extending column defining a vertical axis, said column being defined by a plurality of generally flat side panels sloping inwardly and upwardly, said panels designed to be retroreflectant and to provide a higher degree of retroreflection in directions normal to said panels and substantial but lesser retroreflectance at other angles, said pylon including a flange member, outwardly extending from the bottom of each side panel, said flange member being hollow and provided with means for filling with ballasting material, wherein said side panels slope upwardly at between 8° and 10° to the vertical axis.

15. Landing pylon comprising means for stably supporting, on a support surface, an upwardly extending column, defining a vertical axis; said upwardly extending column, being defined by a plurality of generally flat side panels sloping inwardly and upwardly at between 3° and 10° to the vertical axis, said panels designed to be retroreflectant and to provide a higher degree of retroreflection in directions normal to said panels and substantial but lesser retroreflectance at other angles, wherein upper retroreflectant panels are provided sloping inwardly from the top edge of each side panel for a short distance relative to their width at an angle of 30°-60° to the vertical axis.

16. Landing pylon as claimed in claim 15 wherein said upper panels slope at an angle of about 45° to the vertical axis.

17. Landing pylon as claimed in claim 16 wherein a horizontal top panel meets the upper edges of said upper panels.

18. Landing pylon as claimed in claim 15 wherein a horizontal top panel meets the upper edges of said upper panels.

19. Landing pylon comprising an upwardly extending column, defining a vertical axis, said column having a plurality of generally flat side panels sloping inwardly and upwardly, and a top panel, said panels designed to be retroreflective and to provide a higher degree of retroreflection in directions normal to said panels and substantial but lesser retroreflection at other angles, said pylon including a flange member, outwardly extending from the bottom of each side panel, said pylon being hollow and designed for nesting and having a bottom opening inwardly of said flange adapted to receive the column of the next lower pylon in stacked arrangement, said flange being arranged relative to said column so that the flanges of adjacent pylons contact and maintain the respective side and top panels spaced in stacked arrangement.

20. Landing pylon as claimed in claim 19 wherein said flange member is hollow and provided with means for filling with ballasting material.

21. Landing pylon as claimed in claim 20 wherein said side panels slope upwardly at between 3° and 10° to the vertical axis.

22. Landing pylon as claimed in claim 21 wherein upper retroreflectant panels are provided sloping inwardly from the top edge of each side panel for a short distance relative to their width at an angle of 30°-60° to the vertical axis and said flange is arranged relative to said column to space in the upper panels of adjacent pylons in stacked arrangement.

23. Landing pylon as claimed in claim 20 wherein upper retroreflectant panels are provided sloping inwardly from the top edge of each side panel for a short distance relative to their width at an angle of 30°-60° to the vertical axis and said flange is arranged relative to said column to space the upper panels of adjacent pylons in stacked arrangement.

24. Landing pylon as claimed in claim 19 wherein said side panels slope upwardly at between 3° and 10° to the vertical axis.

25. Landing pylon as claimed in claim 24 wherein upper retroreflectant panels are provided sloping inwardly from the top edge of each side panel for a short distance relative to their width at an angle of 30°-60° to the vertical axis and said flange is arranged relative to said column to space the upper panels of adjacent pylons in stacked arrangement.

26. Landing pylon as claimed in claim 19 wherein upper retroreflectant panels are provided sloping inwardly from the top edge of each side panel for a short distance relative to their width at an angle of 30°-60° to the vertical axis and said flange is arranged relative to said column to space the upper panels of adjacent pylons in stacked arrangement.

* * * * *